(12) United States Patent
Chen et al.

(10) Patent No.: US 10,550,882 B2
(45) Date of Patent: Feb. 4, 2020

(54) DRAWER SLIDE ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Fang-Cheng Su, Kaohsiung (TW); Shih-Lung Huang, Kaohsiung (TW); Ci-Bin Huang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 673 days.

(21) Appl. No.: 15/202,829

(22) Filed: Jul. 6, 2016

(65) Prior Publication Data
US 2017/0135477 A1 May 18, 2017

(30) Foreign Application Priority Data

Nov. 12, 2015 (TW) .............................. 104137459 A

(51) Int. Cl.
F16C 29/00 (2006.01)
A47B 88/95 (2017.01)
A47B 88/956 (2017.01)

(52) U.S. Cl.
CPC ............ *F16C 29/004* (2013.01); *A47B 88/95* (2017.01); *A47B 88/956* (2017.01);
(Continued)

(58) Field of Classification Search
CPC ..... A47B 88/0422; A47B 88/08; A47B 88/95; A47B 88/956; A47B 2088/0433;
(Continued)

(56) References Cited

U.S. PATENT DOCUMENTS 4,995,683 A * 2/1991 Albiez ................ A47B 88/956
312/348.4
8,955,929 B2 2/2015 Hozapfel et al.
(Continued)

FOREIGN PATENT DOCUMENTS

CN 102058253 A 5/2011
DE 202015102087 U1 * 7/2015 ........... A47B 88/956
(Continued)

OTHER PUBLICATIONS

European Office Action Regarding a Counterpart Foreign Application dated Mar. 15, 2017.

*Primary Examiner* — Daniel J Troy
*Assistant Examiner* — Ryan A Doyle
(74) *Attorney, Agent, or Firm* — Rosenberg, Klein & Lee

(57) ABSTRACT

A drawer slide assembly includes first and second rails, a drawer frame member, a mounting device, and an inserting member. The second rail is longitudinally movable with respect to the first rail. The drawer frame member is connected to the second rail and includes a carrier and a drawer sidewall connected to the carrier. The mounting device is connected to the drawer frame member and/or the second rail and includes an engaging member and a guiding member. The engaging member has an engaging portion corresponding to the guiding member. The inserting member corresponds to the guiding member and can be inserted thereinto to displace the engaging member to an engaged position and, by engaging with the engaging portion, be mounted to the mounting device.

13 Claims, 16 Drawing Sheets

(52) U.S. Cl.
CPC .  *A47B 2088/954* (2017.01); *A47B 2210/0016* (2013.01); *A47B 2210/0056* (2013.01); *A47B 2210/09* (2013.01); *F16C 2314/72* (2013.01)

(58) Field of Classification Search
CPC ...... A47B 2088/954; A47B 2210/0016; A47B 2210/0056; A47B 2210/09; F16C 29/004; F16C 2314/72
See application file for complete search history.

(56) References Cited

U.S. PATENT DOCUMENTS

| | | | |
|---|---|---|---|
| 9,039,108 B2 | 5/2015 | Feuerstein | |
| 2014/0070687 A1* | 3/2014 | Holzapfel | A47B 96/00 312/348.4 |
| 2014/0077677 A1 | 3/2014 | Holzapfel et al. | |
| 2014/0312756 A1* | 10/2014 | Ng | A47B 88/956 312/334.5 |
| 2015/0115788 A1* | 4/2015 | Ng | A47B 88/95 312/348.4 |
| 2018/0000242 A1* | 1/2018 | Hoffmann | A47B 88/95 |

FOREIGN PATENT DOCUMENTS

| | | | | |
|---|---|---|---|---|
| GB | 2532100 A * | 5/2016 | ........... | A47B 88/956 |
| JP | 2014-512224 A | 5/2014 | | |
| JP | 2014-517754 A | 7/2014 | | |
| WO | 2012/055156 A1 | 5/2012 | | |
| WO | WO-2012055156 A1 * | 5/2012 | ........... | A47B 88/956 |
| WO | 2013/025181 A2 | 2/2013 | | |
| WO | WO-2013025181 A2 * | 2/2013 | ............. | A47B 88/95 |

\* cited by examiner

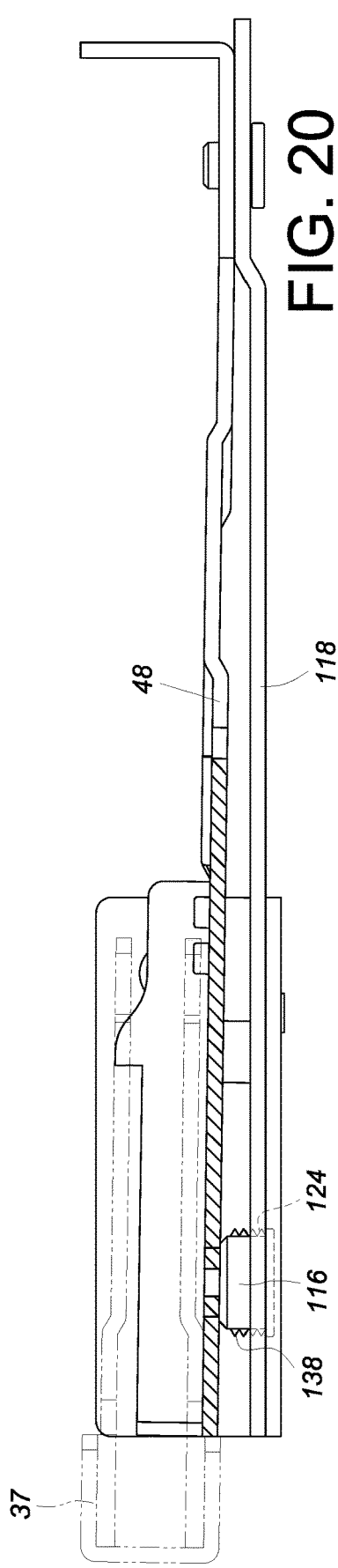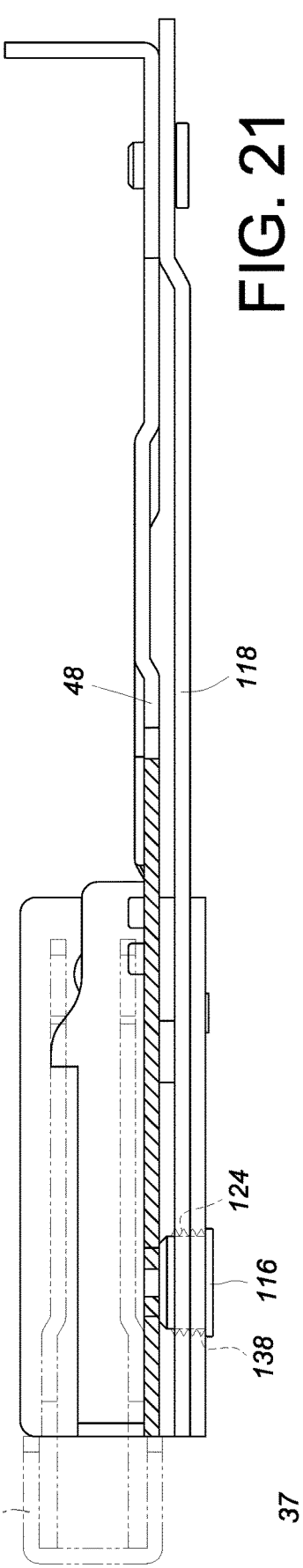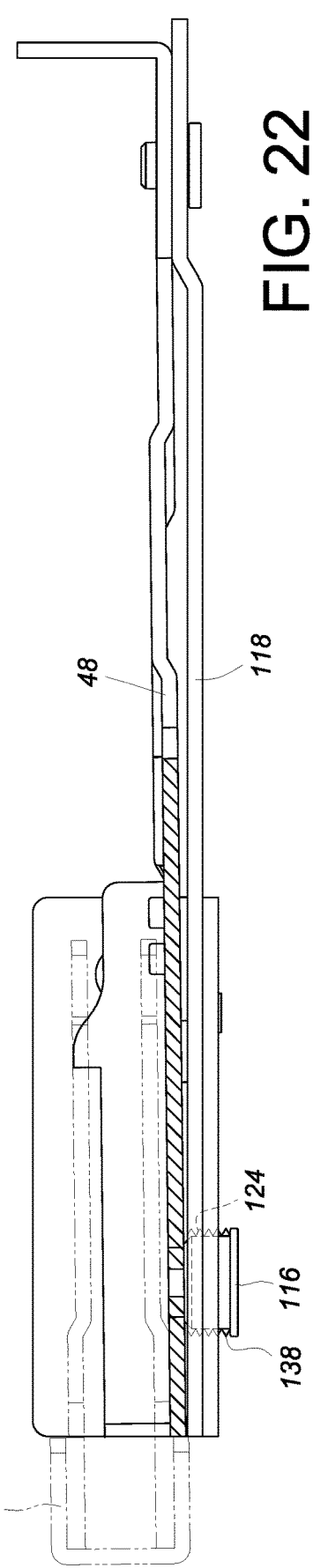

DRAWER SLIDE ASSEMBLY

FIELD OF THE INVENTION

The present invention relates to a drawer slide assembly which includes a mounting device for mounting a component of a piece of furniture to the drawer slide assembly with ease.

BACKGROUND OF THE INVENTION

U.S. Pat. No. 8,955,929 B2 and US Patent Application Publication No. 2014/0077677 A1, the inventers of both of which are Holzapfel et al. and which are incorporated herein by reference, disclose mounting devices of drawer slide assembly, wherein the structures disclosed serve mainly to connect a front panel to a drawer sidewall. More specifically, the drawer sidewall is provided with a fastening device 1, which includes a catching device 10 and a main plate 73. The main plate 73 provides a feed path 6 through which a pin of the front panel can be guided to a receiving means 13 of the catching device 10. During displacement along the feed path 6, however, the pin of the front panel may become instable (e.g., may wobble or tilt), thus deviating from the feed path 6, and the pin's failure to move to the receiving means 13 along the predetermined path causes inconvenience to assembly.

SUMMARY OF THE INVENTION

The present invention relates to a drawer slide assembly to which a furniture component can be easily mounted.

According to one aspect of the invention, a drawer slide assembly includes a first rail, a second rail, a drawer frame member, a mounting device, and an inserting member. The second rail is longitudinally movable with respect to the first rail. The drawer frame member is connected to the second rail and includes a carrier and a drawer sidewall connected to the carrier. The mounting device is connected to at least one of the drawer frame member and the second rail and includes an engaging member and a guiding member. The engaging member has an engaging portion corresponding to the guiding member. The inserting member, to be connected to the mounting device, corresponds to the guiding member and is configured to be inserted into the guiding member in order to displace the engaging member to an engaged position, where the inserting member is engaged with the engaging portion and thus mounted to the mounting device.

Preferably, the mounting device includes a base, a transmission assembly, and an elastic member. The transmission assembly includes a first transmission member and a second transmission member, which are pivotally connected to the base and mesh with each other. The engaging member is connected to the first transmission member while the elastic member is connected to the second transmission member. The engaging member can be moved to the engaged position by the elastic force of the elastic member when the second transmission member is driven by the first transmission member.

Preferably, the mounting device further includes a position-limiting member connected to the base, and the second transmission member has a position-limiting portion. The position-limiting portion is engaged with the position-limiting member when the second transmission member is rotated to a locked position.

Preferably, each of the drawer sidewall and the base has an opening corresponding to the second transmission member, and the second transmission member has a tool hole corresponding to the position-limiting member. A tool can be inserted through the tool hole by way of the openings in order to push the position-limiting member, thereby disengaging the position-limiting member from the position-limiting portion and allowing the second transmission member to move from the locked position to an unlocked position.

Preferably, the mounting device further includes an inclination adjustment assembly for adjusting the angle of the mounting device with respect to the drawer sidewall.

Preferably, the inclination adjustment assembly includes an inner plate and an inclination adjustment member. The inner plate has a hole. The inclination adjustment member is eccentrically provided with a pivot portion, is located in the hole of the inner plate, and abuts against the inner plate. The pivot portion extends through the hole of the inner plate and is pivotally connected to the base. When the inclination adjustment member is rotated, the base adjusts the tilt angle of the mounting device with respect to the drawer frame member in response to displacement of the inclination adjustment member.

Preferably, the mounting device further includes a transverse adjustment member for adjusting the transverse position of the mounting device with respect to the drawer sidewall.

Preferably, the inner plate has a threaded hole, and the transverse adjustment member has a pivot portion and a threaded connection portion connected to the pivot portion of the transverse adjustment member. The pivot portion of the transverse adjustment member extends through the threaded hole and is pivotally connected to the base. The threaded connection portion is threadedly connected with the threaded hole. Thus, by rotating the transverse adjustment member, the base is transversely displaced with respect to the drawer sidewall.

Preferably, the mounting device further includes a height adjustment assembly for adjusting the height of the mounting device with respect to the drawer sidewall.

Preferably, the height adjustment assembly includes an outer plate and a height adjustment member. The outer plate has a hole. The height adjustment member is eccentrically provided with a pivot portion, is located in the hole of the outer plate, and abuts against the outer plate. The pivot portion of the height adjustment member extends through the hole of the outer plate and is pivotally connected to the base. When the height adjustment member is rotated, the base adjusts its own height with respect to the drawer frame member in response to displacement of the height adjustment member.

One of the advantageous features of the present invention is that, when inserted into the guiding member, the inserting member of the furniture component displaces the engaging member to an engaged position and becomes engaged with the engaging member. This allows the furniture component to be mounted to the drawer slide assembly with ease.

BRIEF DESCRIPTION OF THE DRAWINGS

FIG. 20 shows the mounting device in FIG. 13 at a first transverse position;

FIG. 21 shows the mounting device in FIG. 20 adjusted to a second transverse position;

FIG. 22 shows the mounting device in FIG. 21 adjusted to a third transverse position;

DETAILED DESCRIPTION OF THE INVENTION

Figure 1:
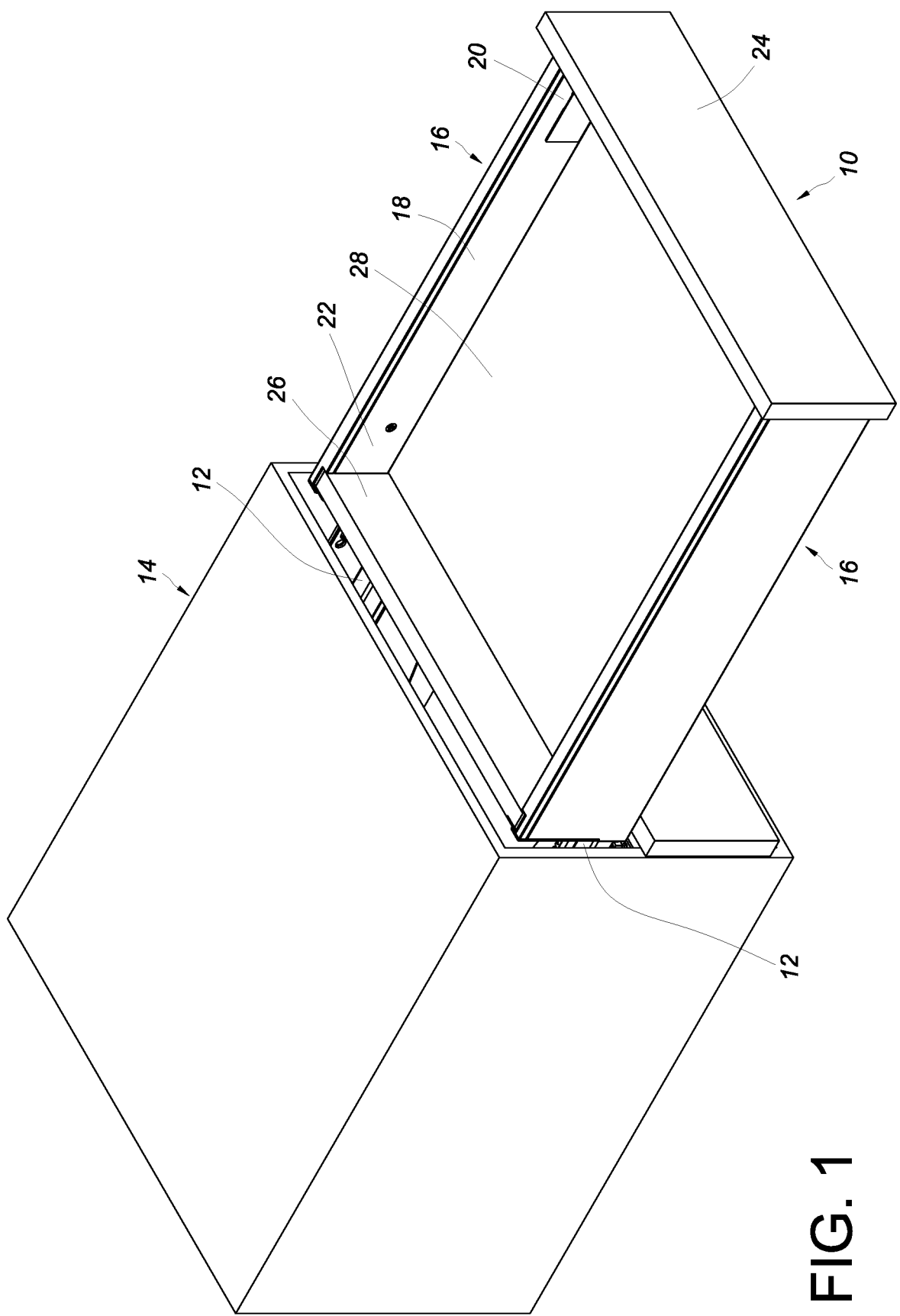
FIG. 1 is a perspective view showing how a drawer in a preferred embodiment of the present invention is mounted to a cabinet via a pair of slide assemblies.

Referring to FIG. 1, a drawer 10 in an embodiment of the present invention is mounted to a cabinet 14 via a pair of slide assemblies 12 so as to be pulled out of and pushed back into the cabinet 14 smoothly. The drawer 10 includes a pair of drawer frame members 16. Each drawer frame member 16 includes a drawer sidewall 18, and each drawer sidewall 18 includes a front end portion 20 and a rear end portion 22. The front end portions 20 and the rear end portions 22 of the drawer sidewalls 18 of the pair of drawer frame members 16 are connected to a front panel 24 and a rear panel 26 respectively. The pair of drawer sidewalls 18, the front panel 24, and the rear panel 26 are connected to a drawer bottom panel 28 to form the drawer 10.

Figure 2:
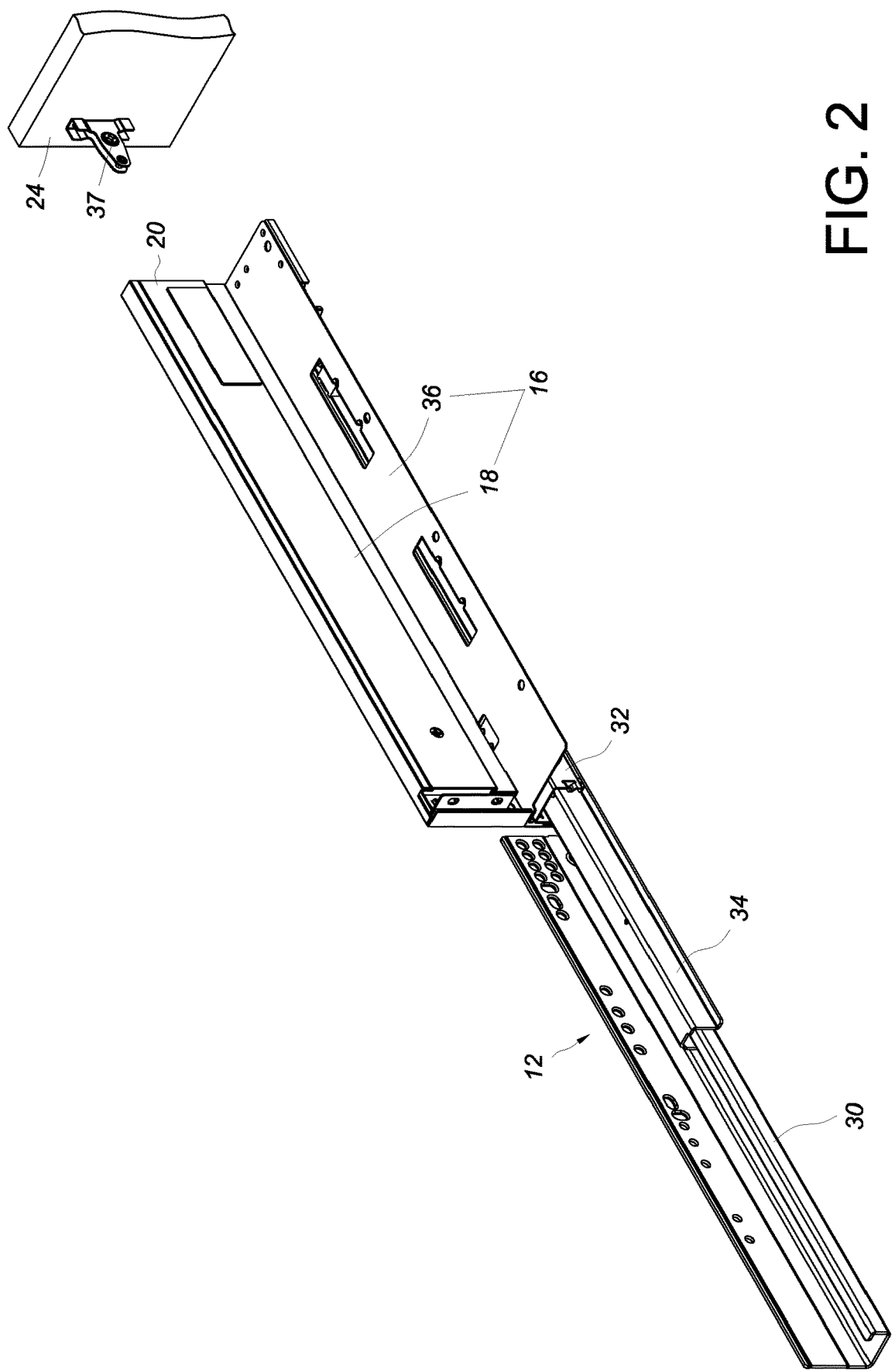
FIG. 2 is an exploded perspective view of a drawer slide assembly and a front panel in the preferred embodiment of FIG. 1.

As shown in FIG. 2, the slide assembly 12 includes a first rail 30 and a second rail 32 which is longitudinally movable with respect to the first rail 30. Preferably, the slide assembly 12 further includes a third rail 34 movably connected between the first rail 30 and the second rail 32, wherein the third rail 34 allows the second rail 32 to be pulled farther with respect to the first rail 30. The drawer frame member 16 further includes a carrier 36 connected to the drawer sidewall 18 and is mounted to the second rail 32 via the carrier 36. The front panel 24 has an inserting member 37 corresponding to the front end portion 20 of the drawer sidewall 18.

Figure 3:
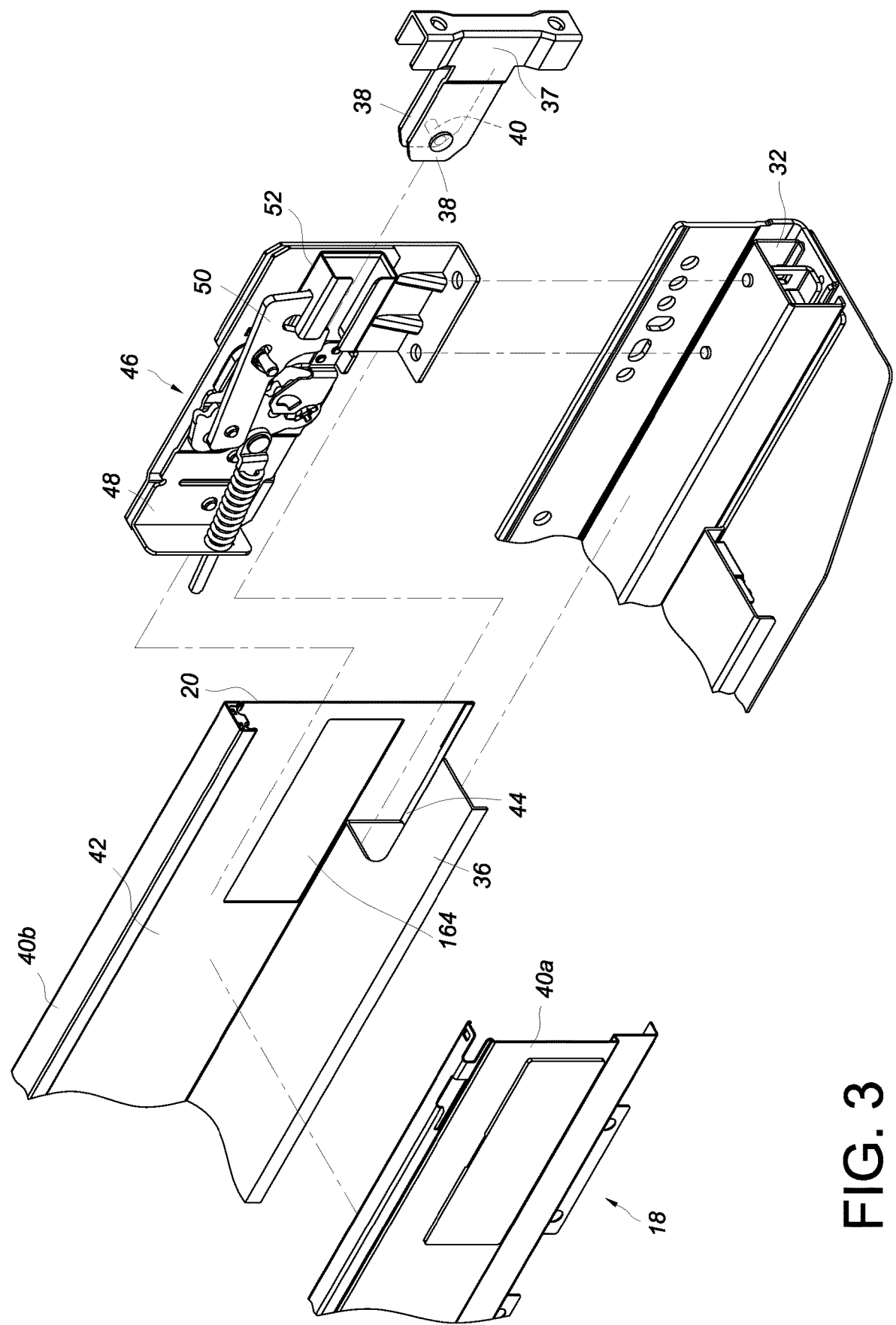
FIG. 3 is an exploded perspective view of the drawer slide assembly in FIG. 2.

Referring to FIG. 3, the inserting member 37 includes a pair of side plates 38 and a pin 40 between the pair of side plates 38. The drawer sidewall 18 includes two plates 40a and 40b, which define a receiving space 42 therebetween. The carrier 36 has a notch 44 corresponding to the second rail 32. In addition, a mounting device 46 is located in the receiving space 42. More specifically, the mounting device 46 is located in the notch 44; is connected to the second rail 32 by a connecting means such as riveting, threaded connection, soldering, or mutual engagement; and is adjacent to the front end portion 20 of the drawer sidewall 18. The location and connecting means of the mounting device 46, however, are not limited to the foregoing. In embodiments which are not shown, the mounting device may be fixedly mounted on only the drawer frame member or on both the second rail and the drawer frame member. The mounting device 46 includes a base 48, an engaging member 50, and a guiding member 52. The engaging member 50 is movable with respect to the base 48. The guiding member 52 is connected to the base 48. The inserting member 37 corresponds to the guiding member 52.

Figure 4:
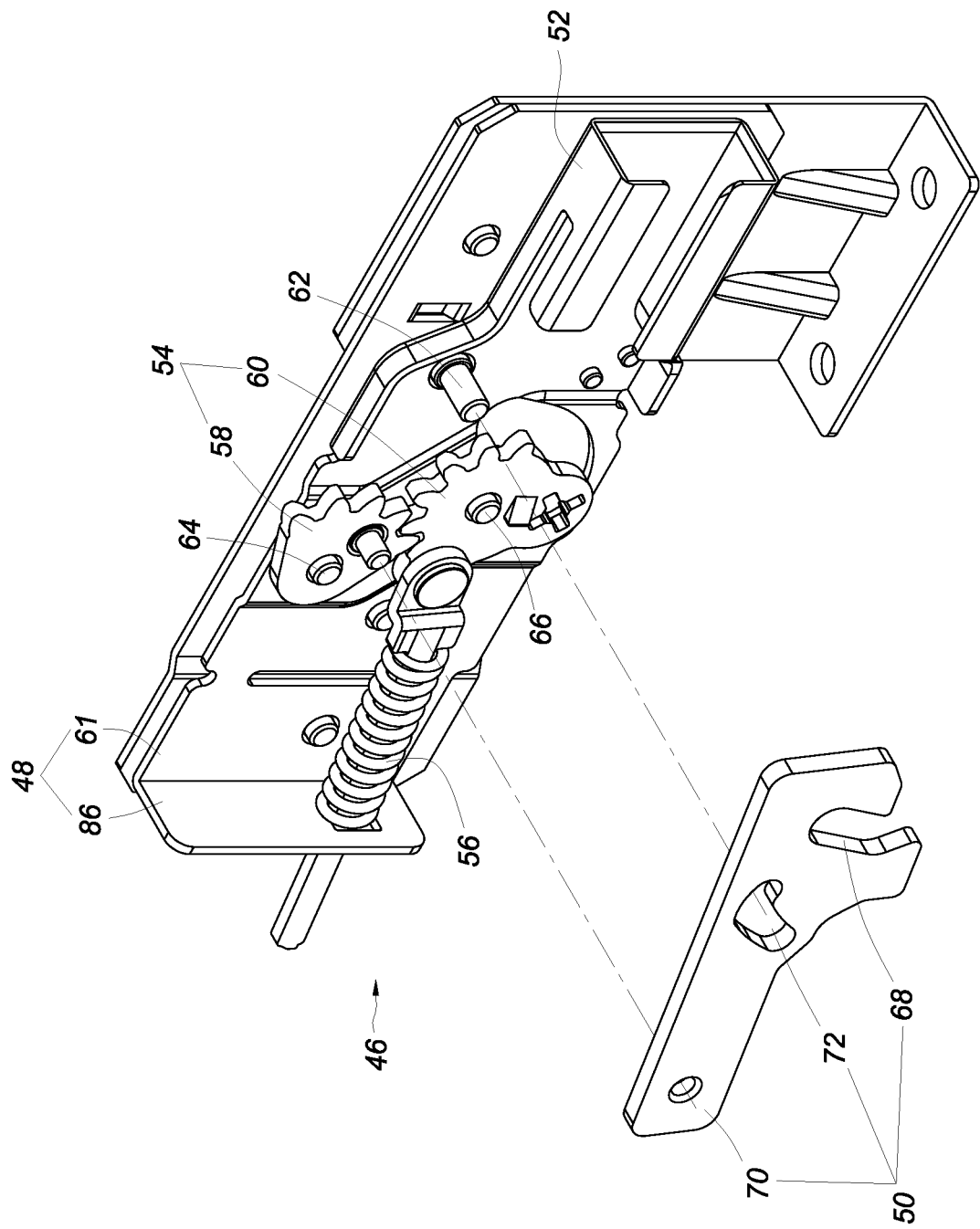
FIG. 4 is an exploded perspective view of the mounting device in FIG. 3, showing in particular the relationship between the engaging member and the base.

As shown in FIG. 4, the mounting device 46 further includes a transmission assembly 54 and an elastic member 56. The transmission assembly 54 includes a first transmission member 58 and a second transmission member 60, which are pivotally connected to the base 48 and mesh with each other. The engaging member 50 is connected to the first transmission member 58, and the elastic member 56 is connected to the second transmission member 60 such that the engaging member 50 can drive the second transmission member 60 via the first transmission member 58 and thus be subjected to the elastic force of the elastic member 56. More specifically, the base 48 includes a base plate 61, and the base plate 61 has a guiding portion 62, a first pivot portion 64, and a second pivot portion 66. The engaging member 50 has an engaging portion 68, a connecting portion 70 opposite the engaging portion 68, and a first curved groove 72 between the engaging portion 68 and the connecting portion 70. The guiding portion 62 of the base 48 corresponds to the first curved groove 72 in order for the engaging member 50 to swing with respect to the base 48 within a limited range.

Figure 5:
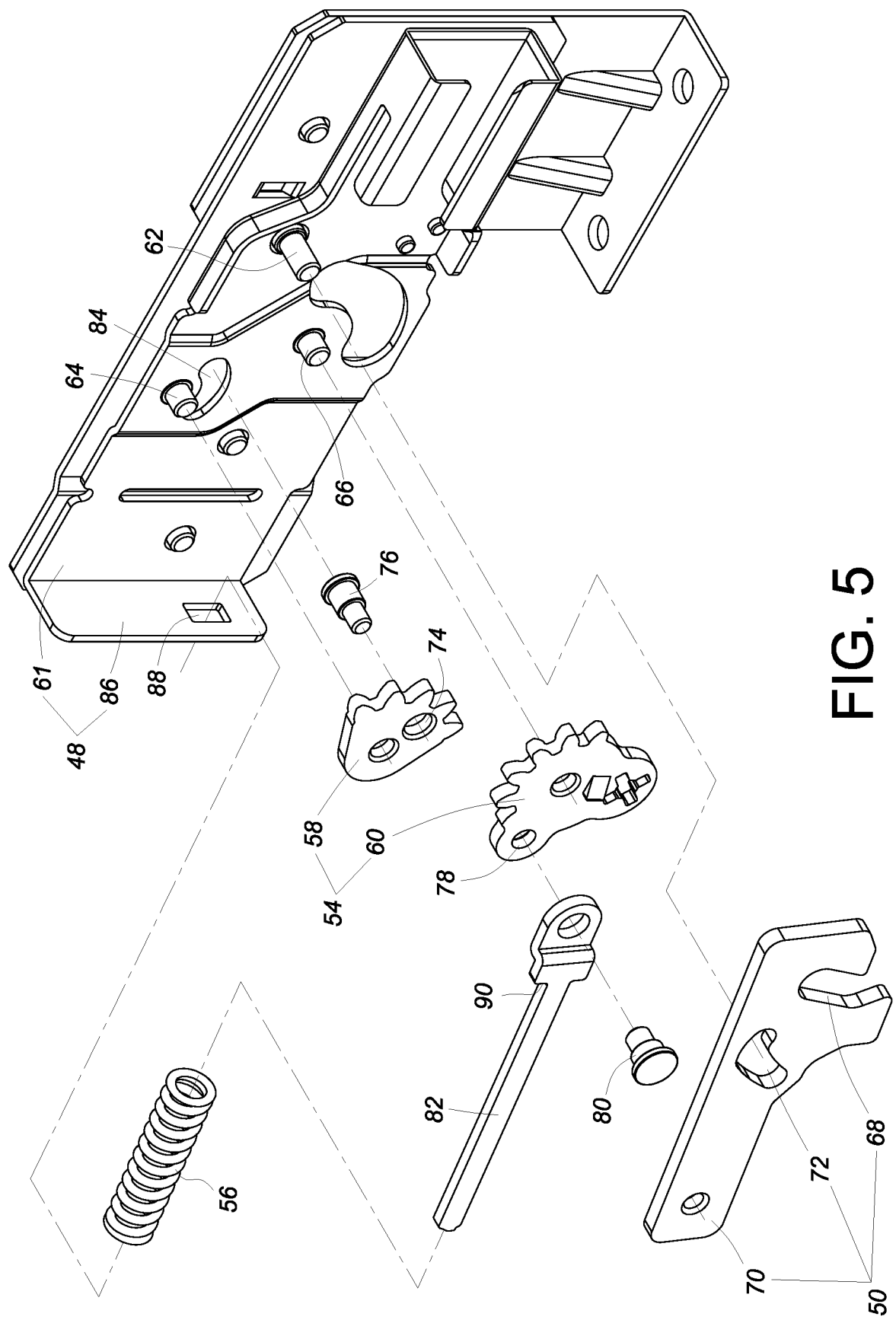
FIG. 5 is another exploded perspective view of the mounting device in FIG. 3, showing in particular the relationship between the engaging member, the transmission assembly, and the base.

As shown in FIG. 4 and FIG. 5, the first transmission member 58 of the transmission assembly 54 is pivotally connected to the first pivot portion 64 of the base plate 61 and is eccentrically provided with a first pivotal connection portion 74. The connecting portion 70 of the engaging member 50 is pivotally connected to the first pivotal connection portion 74 of the first transmission member 58 via a first pivotal connection member 76. The second transmission member 60 of the transmission assembly 54 is pivotally connected to the second pivot portion 66 of the base plate 61 and is eccentrically provided with a second pivotal connection portion 78. The second pivotal connection portion 78 is pivotally connected to an actuating member 82 via a second pivotal connection member 80 and is thus connected to the elastic member 56. Preferably, the base plate 61 has a second curved groove 84 adjacent to the first pivot portion 64, and the first pivotal connection member 76 of the first transmission member 58 partially corresponds to the second curved groove 84 in order for the first transmission member 58 to pivot with respect to the base 48 within a limited range. Preferably, the base 48 further has an end plate 86 substantially perpendicular to the base plate 61, the end plate 86 has a through hole 88, the actuating member 82 has a pressing portion 90, and the elastic member 56 lies between the end plate 86 and the pressing portion 90 of the actuating member 82.

Figure 6:
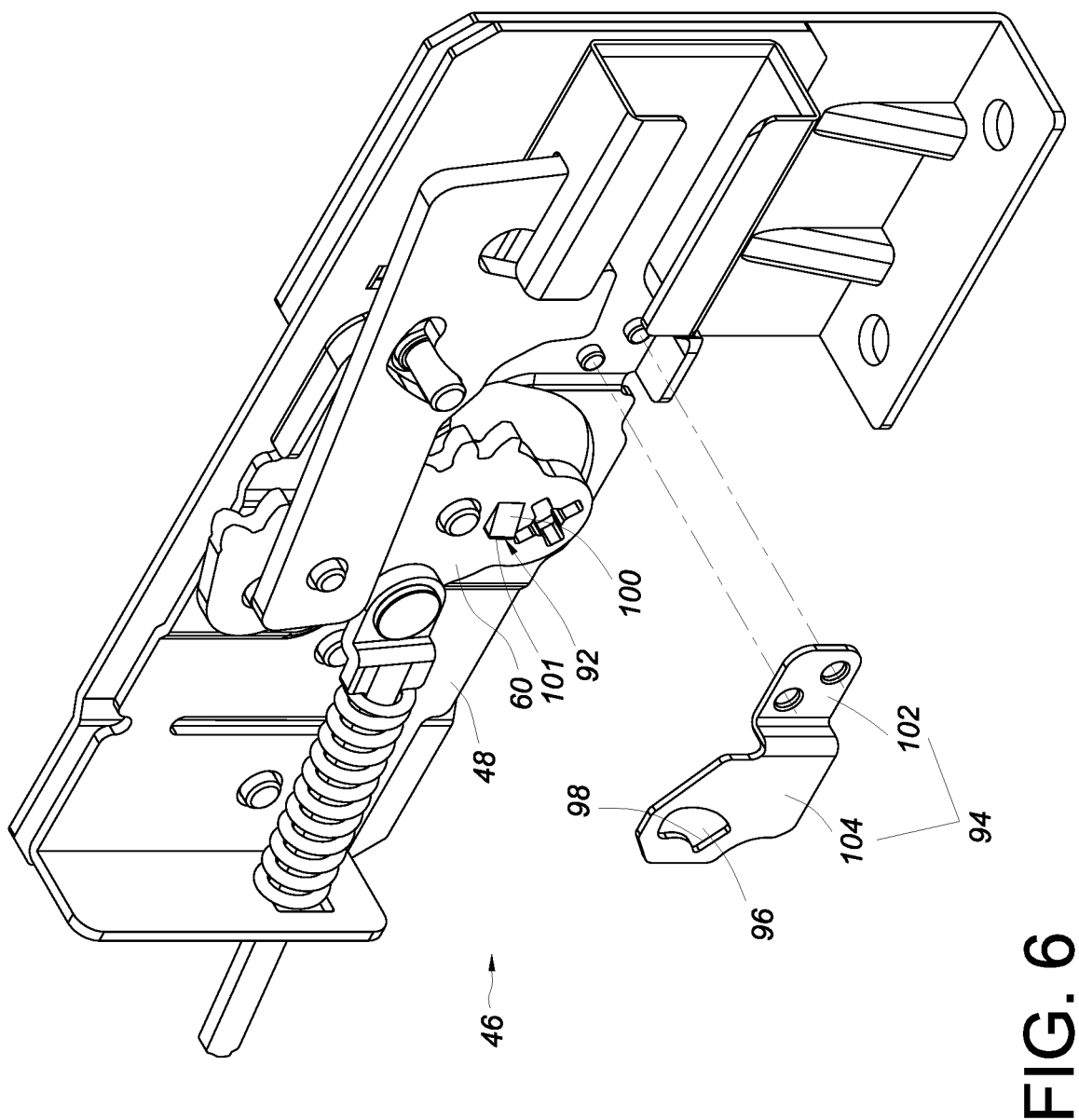
FIG. 6 is yet another exploded perspective view of the mounting device in FIG. 3, showing in particular the relationship between the position-limiting member and the base.
Figure 7:
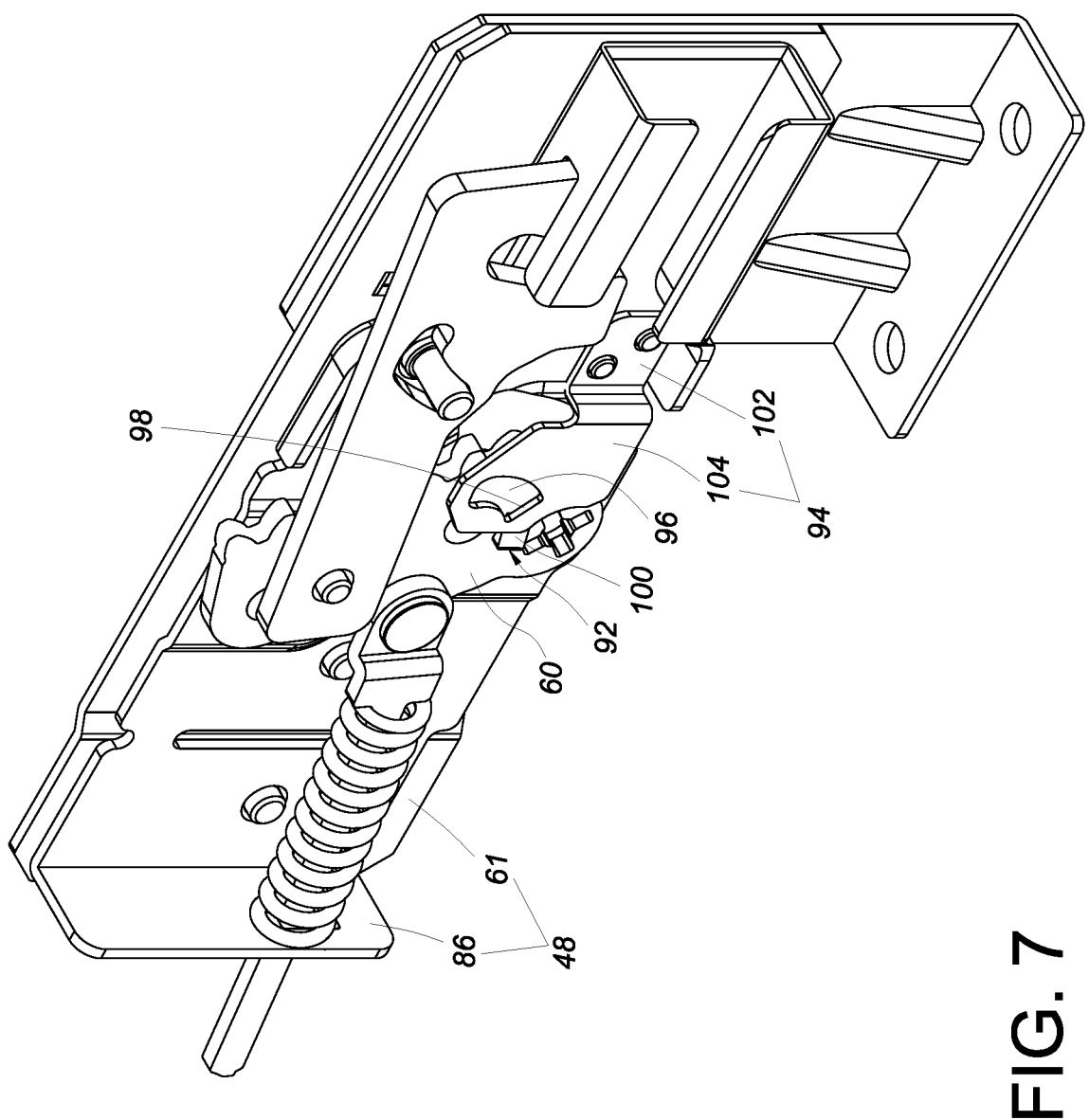
FIG. 7 is a perspective view of the mounting device in FIG. 3.

Referring to FIG. 6 and FIG. 7, the second transmission member 60 has a position-limiting portion 92, and the mounting device 46 further includes a position-limiting member 94. The position-limiting member 94 is connected to the base plate 61 of the base 48 by a connecting means such as riveting, mutual engagement, or threaded connection. The position-limiting member 94 has a coupling portion 102, an elastic portion 104, and a pressing edge 98, wherein the elastic portion 104 extends from the coupling portion 102. The position-limiting portion 92 corresponds to the elastic portion 104. More specifically, the position-limiting portion 92 has an inclined surface 100 and a pressing surface 101, the elastic portion 104 of the position-limiting member 94 has a third curved groove 96, and the second transmission member 60 is movable in order for the position-limiting portion 92 to correspond to the third curved groove 96 of the elastic portion 104.

Figure 8:
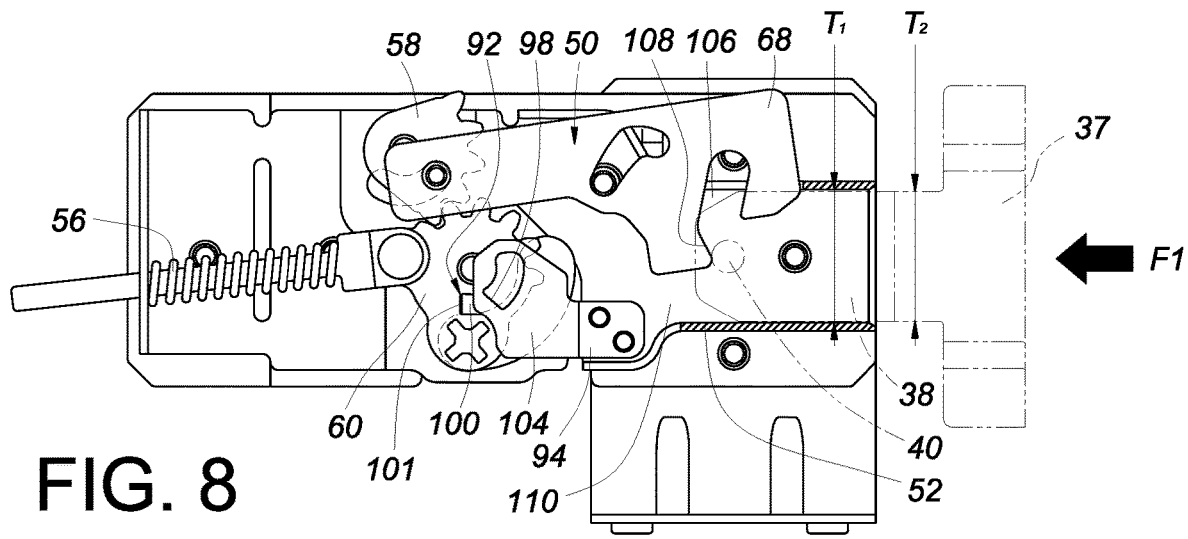
FIG. 8 to FIG. 10 show the assembly process of the preferred embodiment, in particular the inserting member being inserted into the guiding member (FIG. 8), the engaging member being pivotally displaced by the inserting member (FIG. 9), and the engaging member reaching an engaged position after pivotal displacement by the inserting member (FIG. 10)
Figure 9:
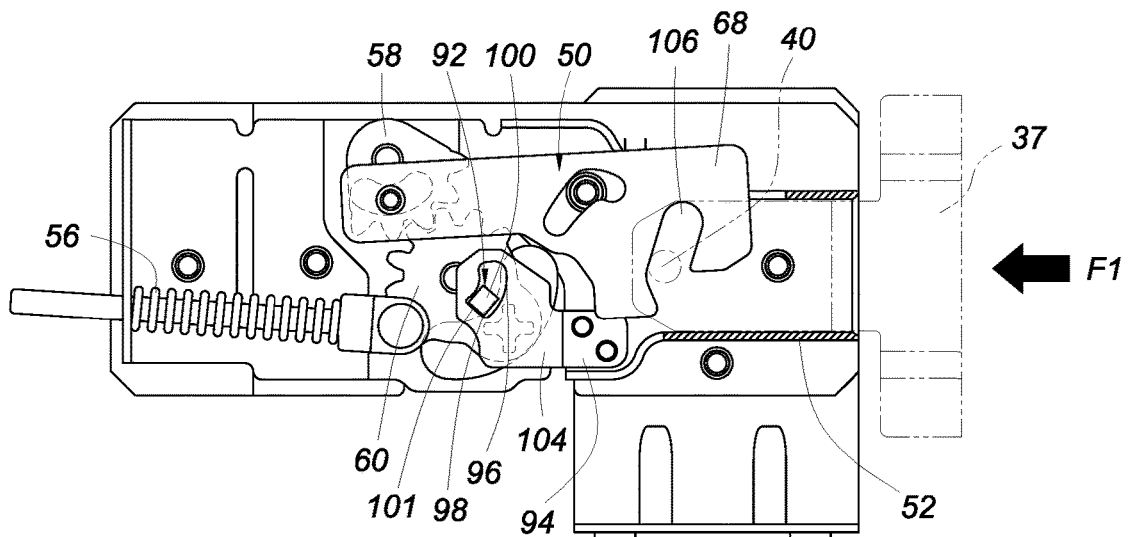
Figure 10:
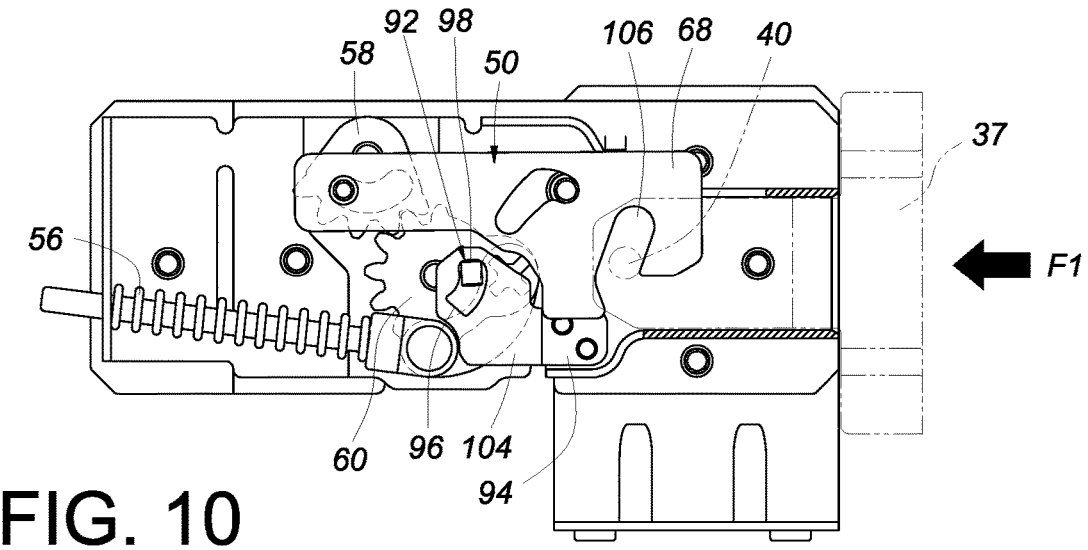

Referring to FIG. 8 to FIG. 10, the engaging portion 68 of the engaging member 50 has a recess 106 and a pressing surface 108 extending aslant from the recess 106. By applying an external force F1 to the inserting member 37, the inserting member 37 is inserted into and displaced along the guiding member 52 of the mounting device 46 such that the pin 40 of the inserting member 37 is pressed against the pressing surface 108 of the engaging member 50. The engaging member 50 is thus pivotally displaced by the external force F1 and drives the first transmission member 58 to pivot against the elastic force of the elastic member 56, thereby driving the second transmission member 60. The position-limiting portion 92 of the second transmission member 60 pushes the elastic portion 104 of the position-limiting member 94 with the inclined surface 100 while being moved into and within the area of the elastic portion 104. Once the elastic force of the elastic portion 104 is released, the pressing surface 101 of the position-limiting portion 92 is pressed against the pressing edge 98 of the position-limiting member 94 to prevent the second transmission member 60 from rotating backward. Preferably, the guiding member 52 defines a guide groove 110 of a width T1, and the side plates 38 of the inserting member 37 have a width T2 substantially corresponding to the width T1 so that the inserting member 37 can be displaced linearly along the guide groove 110.

Referring to FIG. 10, the second transmission member 60 is further pivoted by the elastic force released from the elastic member 56, and in consequence, the position-limiting portion 92 of the second transmission member 60 is moved to a locked position and drives the first transmission member 58 to rotate. The first transmission member 58 in turn pulls the engaging member 50 to an engaged position. Thus, the pin 40 of the inserting member 37 enters the recess 106 of the engaging member 50 and is engaged with the engaging portion 68 of the engaging member 50.

Figure 11:
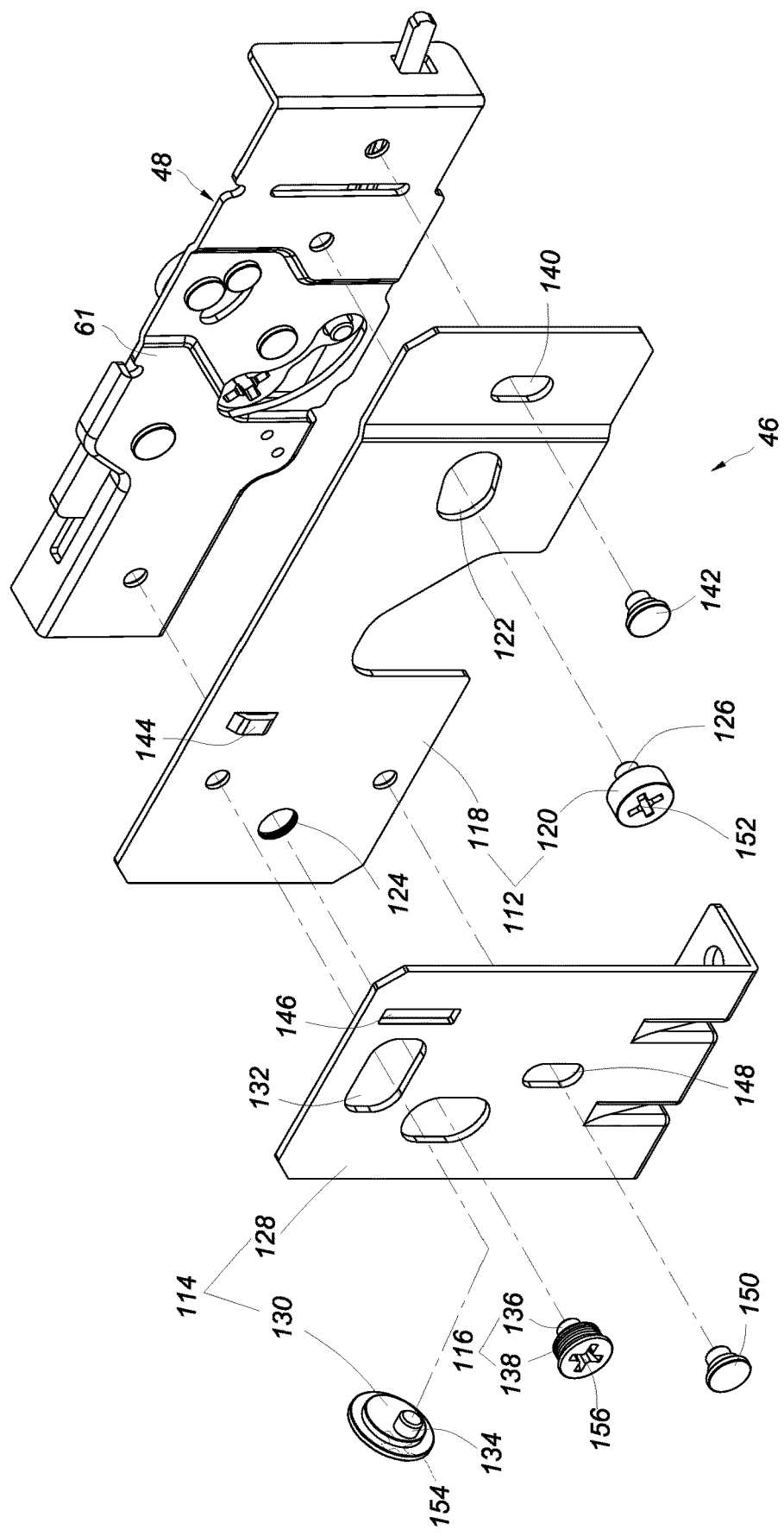
FIG. 11 is still another exploded perspective view of the mounting device in FIG. 3, showing in particular the inclination adjustment assembly, the height adjustment assembly, and the transverse adjustment member in relation to the base.
Figure 12:
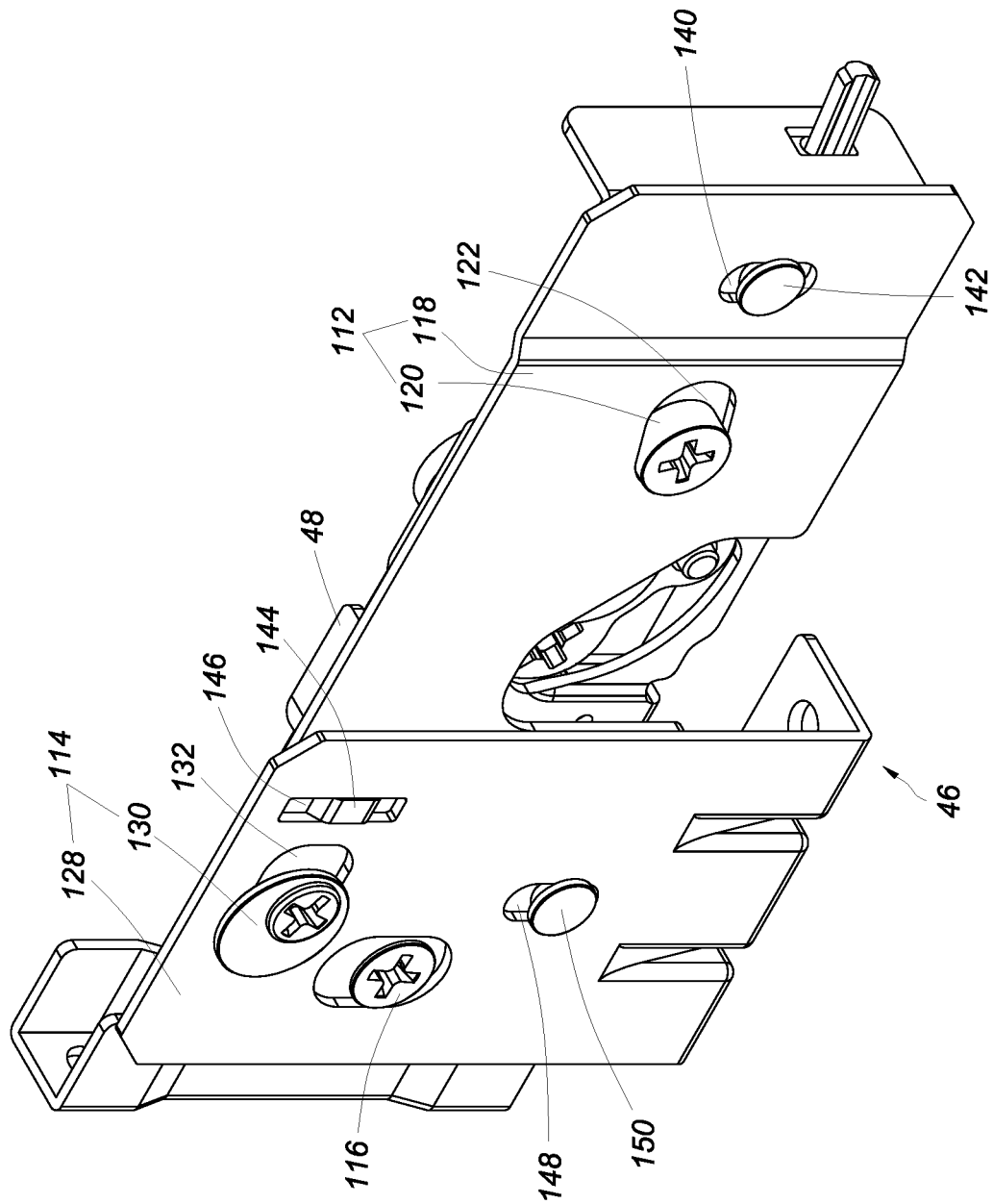
FIG. 12 is another perspective view of the mounting device in FIG. 3.

Referring to FIG. 11 and FIG. 12, the mounting device 46 further includes an inclination adjustment assembly 112, a height adjustment assembly 114, and a transverse adjustment member 116. More specifically, the inclination adjustment assembly 112 includes an inner plate 118 and an inclination adjustment member 120. The inner plate 118 has a first hole 122 and a threaded hole 124. The inclination adjustment member 120 is eccentrically provided with a pivot portion 126, is located in the first hole 122 of the inner plate 118, and abuts against the inner plate 118. The pivot portion 126 of the inclination adjustment member 120 extends through the first hole 122 of the inner plate 118 and is pivotally connected to the base plate 61 of the base 48. The height adjustment assembly 114 includes an outer plate 128 and a height adjustment member 130. The outer plate 128 has a first hole 132. The height adjustment member 130 is eccentrically provided with a pivot portion 134, is located in the first hole 132 of the outer plate 128, and abuts against the outer plate 128. The pivot portion 134 of the height adjustment member 130 extends through the first hole 132 of the outer plate 128 and is pivotally connected to the inner plate 118. The transverse adjustment member 116 has a pivot portion 136 and a threaded connection portion 138 connected to the pivot portion 136. The pivot portion 136 extends through the threaded hole 124 of the inner plate 118 and is pivotally connected to the base plate 61 of the base 48. The threaded connection portion 138 is threadedly connected to the threaded hole 124. Preferably, the inner plate 118 has a first guide groove 140 through which a first guiding member 142 extends to connect with the base plate 61 of the base 48, in order for the base 48 to be displaced with respect to the inner plate 118 under the guidance of the first guiding member 142. Preferably, the inner plate 118 has a guiding block 144, the outer plate 128 has a second guide groove 146 and a third guide groove 148, the guiding block 144 of the inner plate 118 is located in the second guide groove 146, and a second guiding member 150 extends through the third guide groove 148 and is connected with the inner plate 118, in order for the inner plate 118 to be displaced with respect to the outer plate 128 under the guidance of the guiding block 144 and the second guiding member 150. Preferably, the inclination adjustment member 120, the height adjustment member 130, and the transverse adjustment member 116 have tool portions 152, 154, and 156 (e.g., engaging grooves) respectively, and a corresponding tool (e.g., a screwdriver) can be inserted into each engaging groove so that the inclination adjustment member 120, the height adjustment member 130, and the transverse adjustment member 116 can be rotated with ease.

Figure 13:
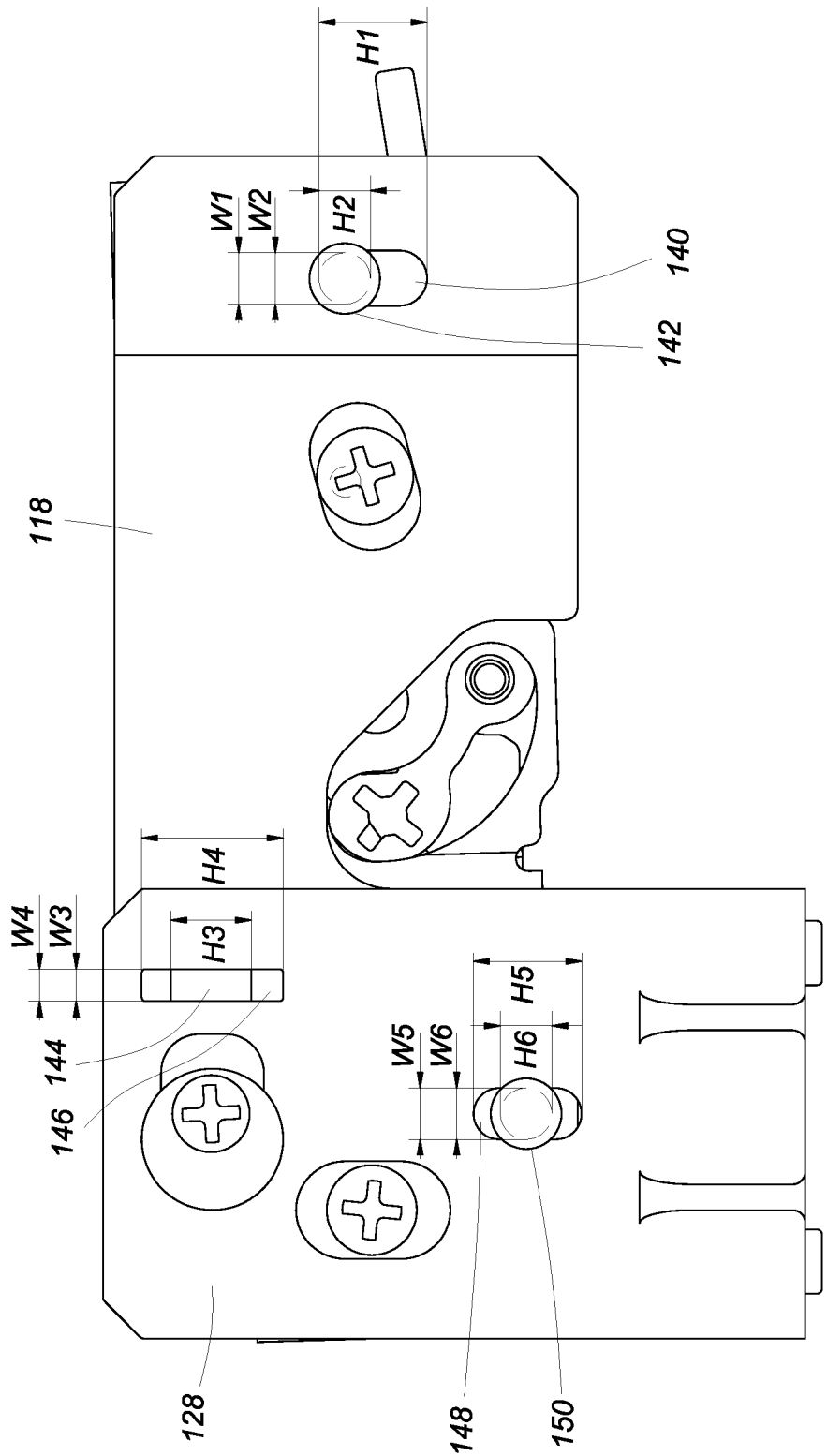
FIG. 13 is a plan view of the mounting device in FIG. 3.

More specifically, referring to FIG. 13, a width W1 is defined as the distance between the two lateral sides of the first guide groove 140 of the inner plate 118, a height H1 is defined as the distance between the upper and lower ends of the first guide groove 140, and the first guiding member 142 has a portion which is located in the first guide groove 140 and which has a width W2 and a height H2. The width W2 is substantially equal to the width W1, but the height H2 is less than the height H1. The guiding block 144 of the inner plate 118 has a width W3 and a height H3, a width W4 is defined as the distance between the two lateral sides of the second guide groove 146 of the outer plate 128, and a height H4 is defined as the distance between the upper and lower ends of the second guide groove 146. The widths W3 and W4 are substantially equal, and yet the height H3 is less than the height H4. A width W5 is defined as the distance between the two lateral sides of the third guide groove 148 of the outer plate 128, a height H5 is defined as the distance between the upper and lower ends of the third guide groove 148, and the second guiding member 150 has a portion which is located in the third guide groove 148 and which has a width W6 and a height H6. The widths W5 and W6 are substantially equal, but the height H6 is less than the height H5.

Figure 14:
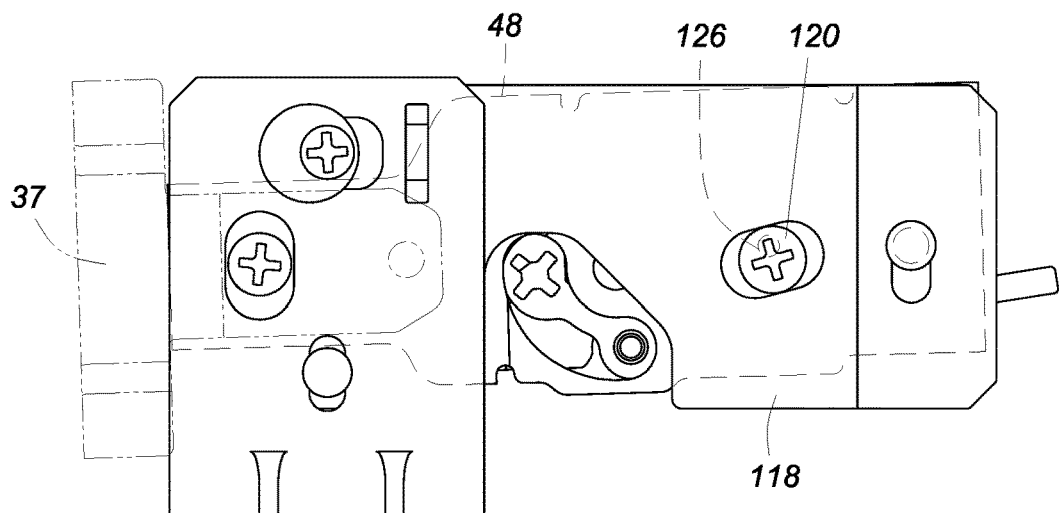
FIG. 14 shows the mounting device in FIG. 13 at a first angle.
Figure 15:
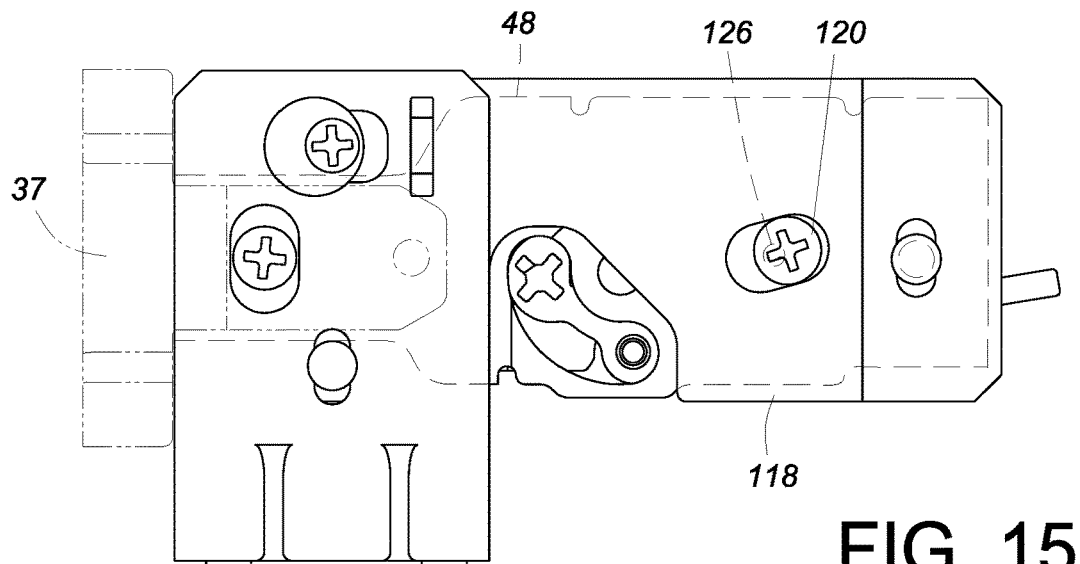
FIG. 15 shows the mounting device in FIG. 14 adjusted to a second angle.
Figure 16:
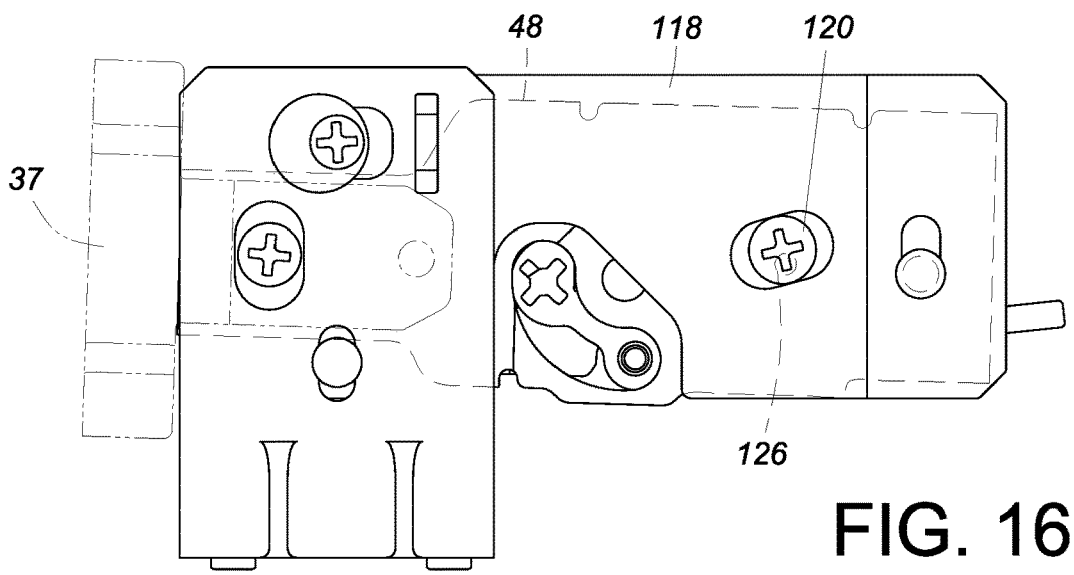
FIG. 16 shows the mounting device in FIG. 15 adjusted to a third angle.

Referring to FIG. 14 and FIG. 15, while the inclination adjustment member 120 is rotated to a first predetermined position, the inserting member 37 is tilted along with the base 48 from a first angle to a second angle due to the displacement of the pivot portion 126 of the inclination adjustment member 120. While the inclination adjustment member 120 is further rotated to a second predetermined position as shown in FIG. 16, the inserting member 37 is tilted along with the base 48 to a third angle due to the displacement of the pivot portion 126 of the inclination adjustment member 120. In other words, the base 48 can respond to displacement of the inclination adjustment member 120 by adjusting its own tilt angle with respect to the inner plate 118 and is therefore adjustable in angle with respect to the inner plate 118.

Figure 17:
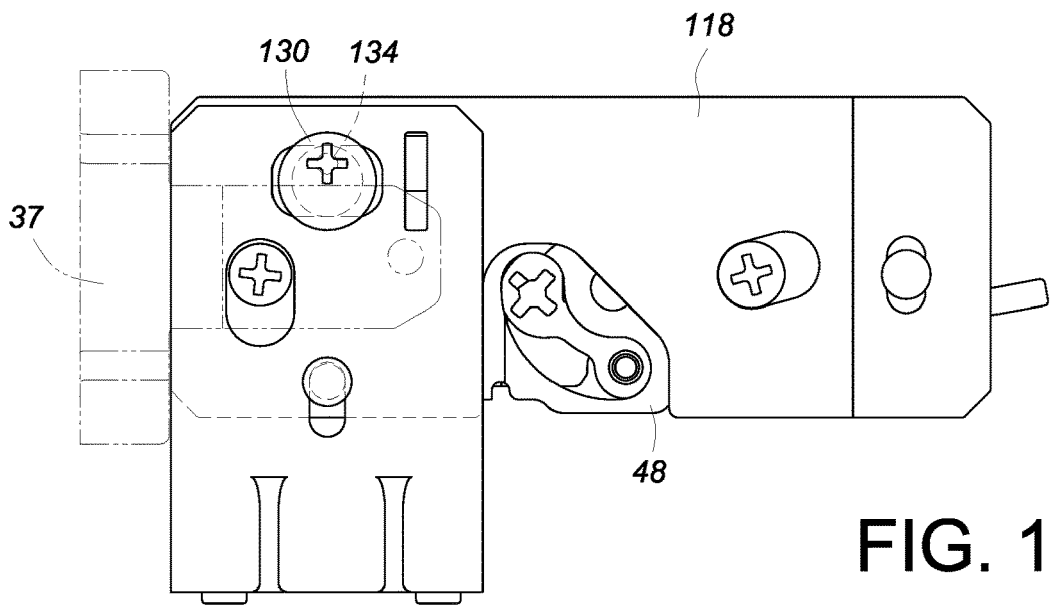
FIG. 17 shows the mounting device in FIG. 13 at a first height.
Figure 18:
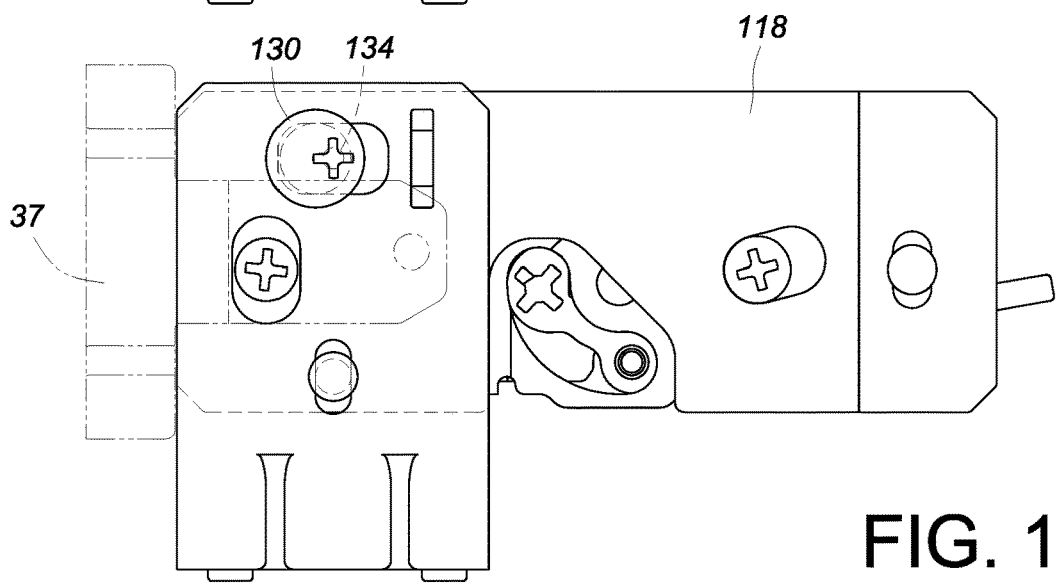
FIG. 18 shows the mounting device in FIG. 17 adjusted to a second height.
Figure 19:
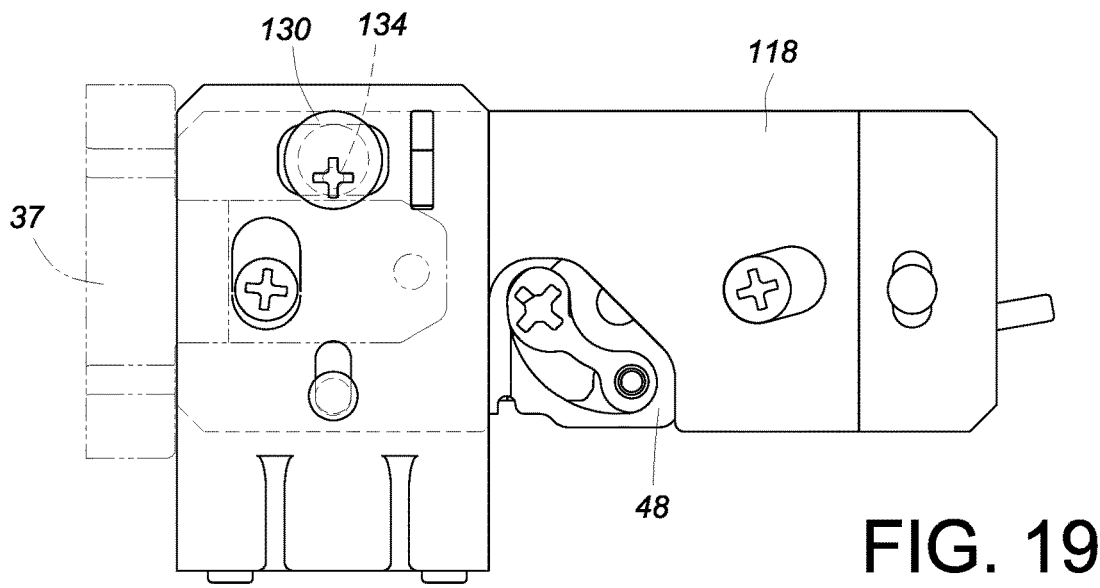
FIG. 19 shows the mounting device in FIG. 18 adjusted to a third height.

Referring to FIG. 17 and FIG. 18, while the height adjustment member 130 is rotated to a first predetermined position, the pivot portion 134 of the height adjustment member 130 is displaced such that the base 48 lowers the inserting member 37 from a first height to a second height with respect to the inner plate 118. While the height adjustment member 130 is further rotated to a second predetermined position as shown in FIG. 19, the displacement of the pivot portion 134 of the height adjustment member 130 causes the base 48 to lower the inserting member 37 to a third height with respect to the inner plate 118.

Referring to FIG. 20 to FIG. 21, while the transverse adjustment member 116 is rotated, the threaded connection portion 138 of the transverse adjustment member 116 is displaced with respect to the threaded hole 124 of the inner plate 118 such that the base 48 moves the inserting member 37 from a first transverse position to a second transverse position with respect to the inner plate 118. While the transverse adjustment member 116 is further rotated to the position shown in FIG. 22, the displacement of the threaded connection portion 138 of the transverse adjustment member 116 with respect to the threaded hole 124 of the inner plate 118 drives the base 48 to move the inserting member 37 to a third transverse position with respect to the inner plate 118.

Figure 23:
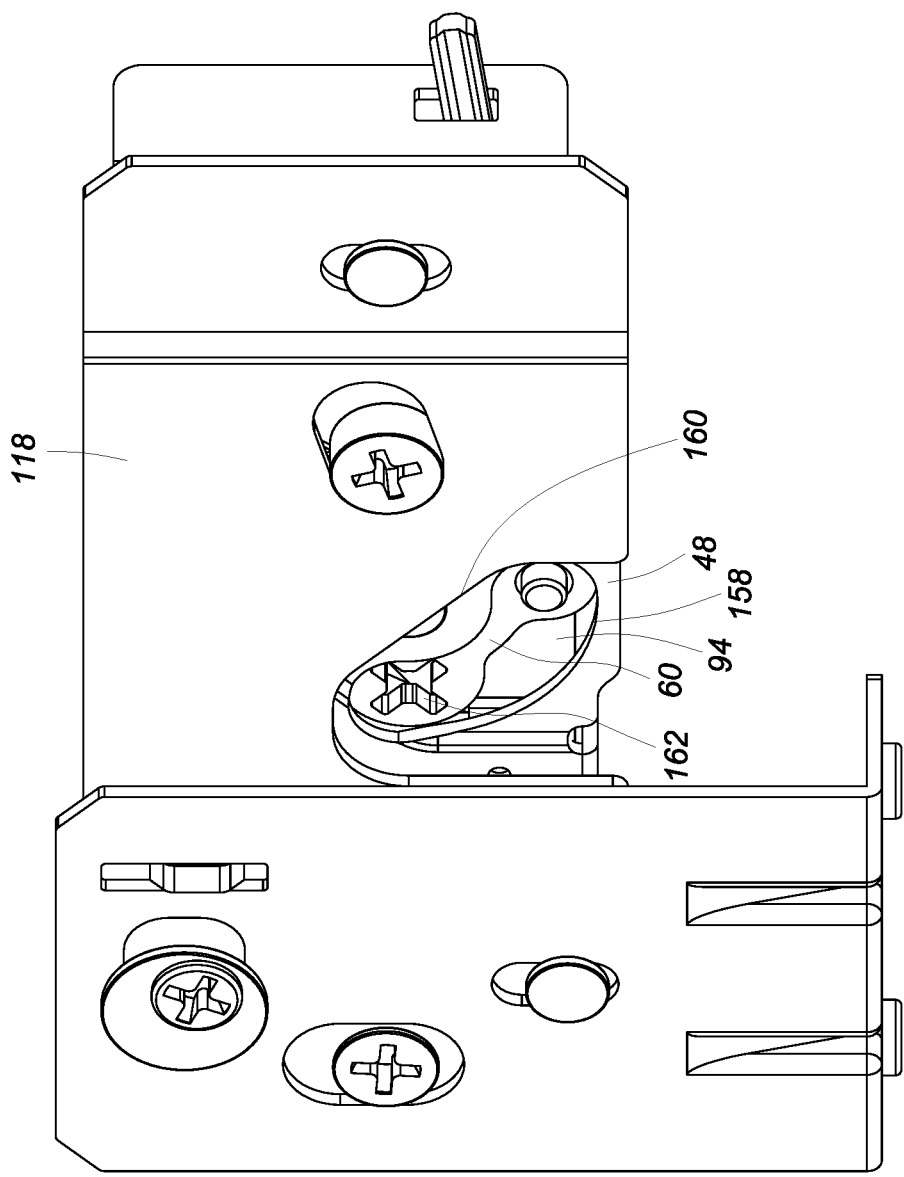
FIG. 23 is yet another perspective view of the mounting device in FIG. 3.

As shown in FIG. 23, the base 48 has an opening 158, and the inner plate 118 has an opening 160. Both openings 158 and 160 correspond to the second transmission member 60. On the other hand, the second transmission member 60 has a tool hole 162 corresponding to the position-limiting member 94, and the tool hole 162 can be a cross-shaped through hole for example. A corresponding tool can be inserted through the through hole to facilitate pushing and thereby displacing the position-limiting member 94.

Figure 24:
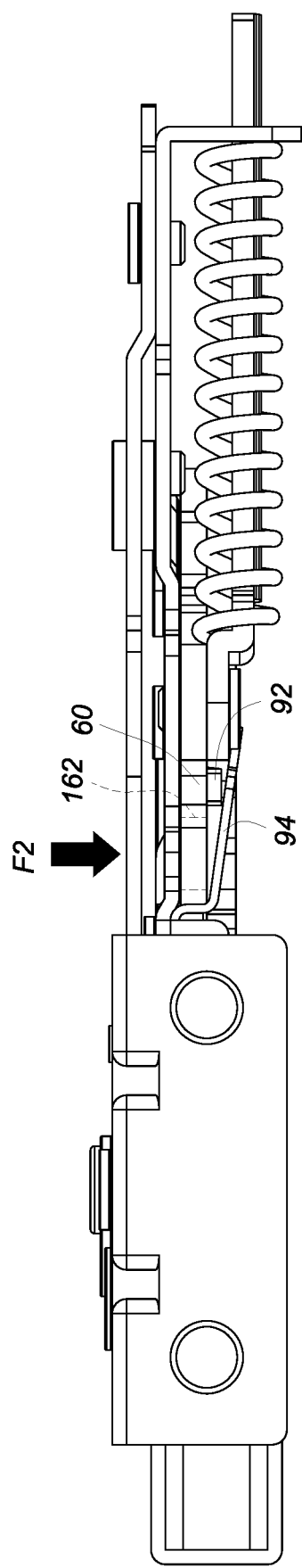
FIG. 24 is a bottom view of the mounting device in FIG. 3, showing in particular how the position-limiting member is pushed by an external force and thus separates from the position-limiting portion of the second transmission member.

As shown in FIG. 24, an external force F2 is applied via a tool (not shown) inserted through the tool hole 162 to push the position-limiting member 94, with a view to separating the position-limiting portion 92 of the second transmission member 60 from the position-limiting member 94.

Figure 25:
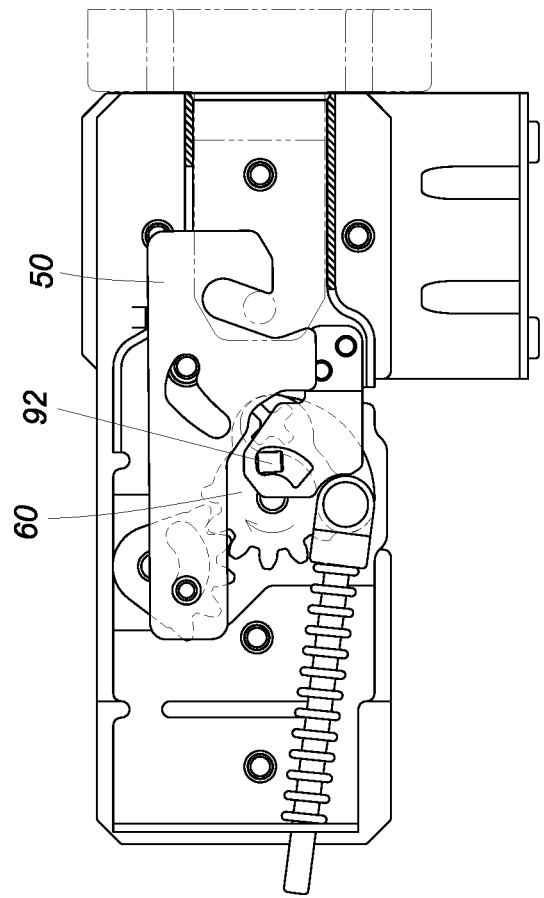
FIG. 25 shows how the second transmission member of the mounting device in FIG. 3 is rotated to an unlocked position by a tool.

Referring to FIG. 25, the tool is turned to rotate the second transmission member 60 from the locked position to an unlocked position, thus disengaging the engaging member 50. Preferably, as shown in FIG. 3, the plate 40b of the drawer sidewall 18 is also provided with an opening 164 in communication with the receiving space 42 to allow passage of the tool.

While the present invention has been disclosed by way of the preferred embodiment described above, the embodiment is not intended to be restrictive of the scope of the invention. The scope of patent protection sought by the applicant is defined by the appended claims.

What is claimed is:

1. A drawer slide assembly, comprising:
   a first rail;
   a second rail movable with respect to the first rail;
   a drawer frame member connected to the second rail, the drawer frame member including a carrier and a drawer sidewall connected to the carrier;
   a mounting device connected to at least one of the drawer frame member and the second rail, the mounting device including an engaging member and a guiding member, the engaging member having an engaging portion corresponding to the guiding member; and
   an inserting member corresponding to the guiding member and configured to be inserted into the guiding member and thereby displace the engaging member to an engaged position, where the inserting member is engaged with the engaging portion and thus mounted to the mounting device;
   wherein the mounting device further includes: a base; a transmission assembly coupled to the base for displacing the engaging member relative to the guiding member; a position-limiting member having a portion transversely displaceable relative to the transmission assembly for selectively locking and unlocking the transmission assembly in position; an elastic member; the transmission assembly includes a first transmission member and a second transmission member; the first transmission member and the second transmission member are pivotally connected to the base and mesh with each other; the engaging member is connected to the first transmission member; the elastic member is connected to the second transmission member, in order for the engaging member to be moved to the engaged position by an elastic force of the elastic member when the second transmission member is driven by the first transmission member; an inclination adjustment assembly for adjusting the mounting device in angle with respect to the drawer sidewall; and a transverse adjustment member for adjusting a transverse position of the mounting device with respect to the drawer sidewall;
   wherein the inclination adjustment assembly includes an inner plate and an inclination adjustment member; the inner plate has a hole; the inclination adjustment member is eccentrically provided with a pivot portion, is located in the hole of the inner plate, and abuts against the inner plate; the pivot portion extends through the hole of the inner plate and is pivotally connected to the base; and when the inclination adjustment member is rotated, the base responds to displacement of the inclination adjustment member by adjusting a tilt angle of the mounting device with respect to the drawer frame member.

2. The drawer slide assembly of claim 1, wherein the position-limiting member is connected to the base, the second transmission member has a position-limiting portion, and the position-limiting portion is engaged with the position-limiting member when the second transmission member is rotated to a locked position.

3. The drawer slide assembly of claim 2, wherein each of the drawer sidewall and the base has an opening corresponding to the second transmission member, the second transmission member has a tool hole corresponding to the position-limiting member, and a tool is able to pass through the tool hole by way of the openings in order to push the position-limiting member and thereby disengage the position-limiting member from the position-limiting portion, allowing the second transmission member to move from the locked position to an unlocked position.

4. The drawer slide assembly of claim 1 wherein the inner plate has a threaded hole, the transverse adjustment member has a pivot portion and a threaded connection portion connected to the pivot portion of the transverse adjustment member, the pivot portion of the transverse adjustment member extends through the threaded hole and is pivotally connected to the base, and the threaded connection portion is threadedly connected with the threaded hole such that, by rotating the transverse adjustment member, the base is transversely displaced with respect to the drawer sidewall.

5. The drawer slide assembly of claim 1, wherein the mounting device further includes a height adjustment assembly for adjusting the mounting device in height with respect to the drawer sidewall.

6. The drawer slide assembly of claim 5, wherein the height adjustment assembly includes an outer plate and a height adjustment member; the outer plate has a hole; the height adjustment member is eccentrically provided with a pivot portion, is located in the hole of the outer plate, and abuts against the outer plate; the pivot portion of the height adjustment member extends through the hole of the outer plate and is pivotally connected to the base; and when the height adjustment member is rotated, the base responds to displacement of the height adjustment member by adjusting in height with respect to the drawer frame member.

7. A mounting device for mounting an inserting member of a furniture component, the mounting device comprising:
a base;
an engaging member movable with respect to the base, the engaging member having an engaging portion;
a guiding member connected to the base and corresponding to the engaging member such that, when inserted into the guiding member, the inserting member displaces the engaging member to an engaged position, where the inserting member is engaged with the engaging portion and thus mounted to the mounting device;
a transmission assembly coupled to the base for displacing the engaging member relative to the guiding member;
a position-limiting member having a portion transversely displaceable relative to the transmission assembly for selectively locking and unlocking the transmission assembly in position;
an inclination adjustment assembly for adjusting the furniture component in angle; the inclination adjustment assembly including an inner plate and an inclination adjustment member; the inner plate has a hole; the inclination adjustment member is eccentrically provided with a pivot portion, is located in the hole of the inner plate, and abuts against the inner plate; the pivot portion extends through the hole of the inner plate and is pivotally connected to the base; and when the inclination adjustment member is rotated, the base responds to displacement of the inclination adjustment member by adjusting a tilt angle of the furniture component; and
a transverse adjustment member for adjusting a transverse position of the furniture component.

8. The mounting device of claim 7, further comprising an elastic member, wherein the transmission assembly includes a first transmission member and a second transmission member, the first transmission member and the second transmission member are pivotally connected to the base and mesh with each other, the engaging member is connected to the first transmission member, and the elastic member is connected to the second transmission member, in order for the engaging member to be moved to the engaged position by an elastic force of the elastic member when the second transmission member is driven by the first transmission member.

9. The mounting device of claim 8, wherein the position-limiting member is connected to the base, the second transmission member having a position-limiting portion, wherein the position-limiting portion is engaged with the position-limiting member when the second transmission member is rotated to a locked position.

10. The mounting device of claim 9, wherein the second transmission member has a tool hole corresponding to the position-limiting member, and a tool is able to pass sequentially through the tool hole in order to push the position-limiting member and thereby disengage the position-limiting member from the position-limiting portion, allowing the second transmission member to move from the locked position to an unlocked position.

11. The mounting device of claim 7, wherein the inner plate has a threaded hole, the transverse adjustment member has a pivot portion and a threaded connection portion connected to the pivot portion of the transverse adjustment member, the pivot portion of the transverse adjustment member extends through the threaded hole and is pivotally connected to the base, and the threaded connection portion is threadedly connected with the threaded hole such that, when the transverse adjustment member is rotated, the base responds to displacement of the transverse adjustment member by adjusting the transverse position of the furniture component.

12. A mounting device for mounting an inserting member of a furniture component, the mounting device comprising:
a base;
an engaging member movable with respect to the base, the engaging member having an engaging portion;
a guiding member connected to the base and corresponding to the engaging member such that, when inserted into the guiding member, the inserting member displaces the engaging member to an engaged position, where the inserting member is engaged with the engaging portion and thus mounted to the mounting device;
an inclination adjustment assembly for adjusting the furniture component in angle, wherein the inclination adjustment assembly includes an inner plate and an inclination adjustment member; the inner plate has a hole; the inclination adjustment member is eccentrically provided with a pivot portion, is located in the hole of the inner plate, and abuts against the inner plate; the pivot portion extends through the hole of the inner plate and is pivotally connected to the base; and when the inclination adjustment member is rotated, the base responds to displacement of the inclination adjustment member by adjusting a tilt angle of the furniture component; and
a height adjustment assembly for adjusting the furniture component in height.

13. The mounting device of claim 12, wherein the height adjustment assembly includes an outer plate and a height adjustment member; the outer plate has a hole; the height adjustment member is eccentrically provided with a pivot portion, is located in the hole of the outer plate, and abuts against the outer plate; the pivot portion of the height adjustment member extends through the hole of the outer plate and is pivotally connected to the base; and when the height adjustment member is rotated, the base responds to displacement of the height adjustment member by adjusting the furniture component in height.

* * * * *